(12) United States Patent
Terasaki et al.

(10) Patent No.: US 6,614,461 B2
(45) Date of Patent: Sep. 2, 2003

(54) PRINTER

(75) Inventors: Kimitoshi Terasaki, Saga (JP); Masahiro Nakashima, Fukuoka (JP); Shuichi Kuriyama, Fukuoka (JP); Tatsuya Hirota, Fukuoka (JP); Yoshikazu Katsumata, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/081,561

(22) Filed: Feb. 20, 2002

(65) Prior Publication Data

US 2003/0095174 A1 May 22, 2003

(30) Foreign Application Priority Data

Nov. 16, 2001 (JP) .......................... 2001-351457
Dec. 27, 2001 (JP) .......................... 2001-396422

(51) Int. Cl.⁷ .............................. B41J 35/36
(52) U.S. Cl. .......................... 347/217; 400/249
(58) Field of Search .................... 347/217; 400/249, 400/703, 207; 324/166, 167, 168, 173, 174

(56) References Cited

U.S. PATENT DOCUMENTS 4,970,531 A 11/1990 Shimizu et al.
5,333,960 A * 8/1994 Nam .......................... 400/249
5,424,635 A * 6/1995 Robinson et al. ........... 324/168

FOREIGN PATENT DOCUMENTS

| EP | 0 351 515 | 1/1990 |
|----|-----------|--------|
| JP | 57-166258 | 10/1982 |
| JP | 63-056482 | 3/1988 |
| JP | 3-68463 | 7/1991 |
| JP | 6-24113 | 2/1994 |

OTHER PUBLICATIONS

International Search Report corresponding to application no. PCT/JP02/11267 dated Mar. 24, 2003.

Japanese Office Action dated Apr. 22, 2003 for Japanese Application No. 2001–396422.

* cited by examiner

Primary Examiner—Huan Tran
(74) Attorney, Agent, or Firm—RatnerPrestia

(57) ABSTRACT

A printer includes a supply shaft wound with unused film including contrast agent, a winding shaft wound with used film including used contrast agent, rotation-speed detector for detecting a rotation speed of the supply shaft, and remaining-amount detector for determining an amount of unused film from the detected rotation speed detected. In the printer, the remaining amount of unused film such as ink film, roll paper or the like can be determined accurately.

20 Claims, 12 Drawing Sheets

PRINTER

FIELD OF THE INVENTION

The present invention relates to a printer used in, for example, a facsimile and a printing apparatus.

BACKGROUND OF THE INVENTION

A conventional thermal transfer printer for a facsimile, a printing apparatus or the like using-ordinary paper as printing paper uses a heat-melting ink film.

FIG. 10 schematically illustrates a method for detecting an amount of ink film remaining in the conventional printer, and FIG. 11 and FIG. 12 schematically illustrate respective rotation speeds of an ink-film-winding shaft of the conventional printer.

As shown in FIG. 10, printing paper 1 undergoes printing using heat-melting ink film 2. The amount of ink film 2 remaining in printer 3 is detected based on the detected rotation speed of winding shaft 4.

Ink film 2 fed from supply shaft 5 passes between thermal transfer head 6 and platen roller 7 to be wound around take-up shaft 4 at a constant speed. Consequently, the rotation speed of winding shaft 4 is high when the amount of ink film 2 wound around winding shaft 4 is small as shown in FIG. 11, and is low when the amount of ink film 2 wound around winding shaft 4 is large as shown in FIG. 12.

In order to detect a variation in the above-described rotation speed, remaining-amount detector 9 detects the remaining amount of ink film 2. In remaining-amount detector 9, the rotation speed, which is detected by rotation-speed detector 8 disposed at winding shaft 4, is related with the remaining amount of ink film 2.

In conventional printer 3, when the rotation speed of winding shaft 4 is high as shown in FIG. 11, rotation-speed detector 8 can detect the rotation speed accurately. Accordingly, the remaining amount of ink film 2 can be detected accurately. When the rotation speed of winding shaft 4 is low as shown in FIG. 12, however, rotation-speed detector 8 cannot detect the rotation speed accurately. Thus, the remaining amount of ink film 2 is hardly detected accurately.

In other words, the amount of ink film 2 remaining sufficiently is detected accurately, although being allowed to be detected roughly. However, the remaining amount of ink film 2, upon being small cannot be detected accurately, although being to be detected accurately. Consequently, a warning for the remaining amount of ink film 2 must be given early for safety.

SUMMARY OF THE INVENTION

A printer includes a supply shaft wound with an unused film having contrast agent, a winding shaft wound with a used film having used contrast agent, a rotation-speed detector for detecting a rotation speed of the supply shaft, and a remaining-amount detector for detecting an amount of the unused ink film from the detected rotation speed.

In the printer, the remaining amount of the unused film such as ink film, roll paper or the like can be detected accurately.

DESCRIPTION OF THE PREFERRED EMBODIMENTS (Exemplary Embodiment 1)

In a printer of a first exemplary embodiment performing thermal transfer printing with ink film or thermal recording paper, a rotation speed of a supply shaft increases with consumption of the ink film or thermal recording paper, and the rotation speed of the supply shaft is accordingly detected accurately. That is, a remaining amount of the ink film or thermal recording paper corresponding to the rotation speed of the supply shaft can be detected accurately as the remaining amount approaches zero.

The first embodiment will be detailed with reference to FIGS. 1–9.

Figure 1:
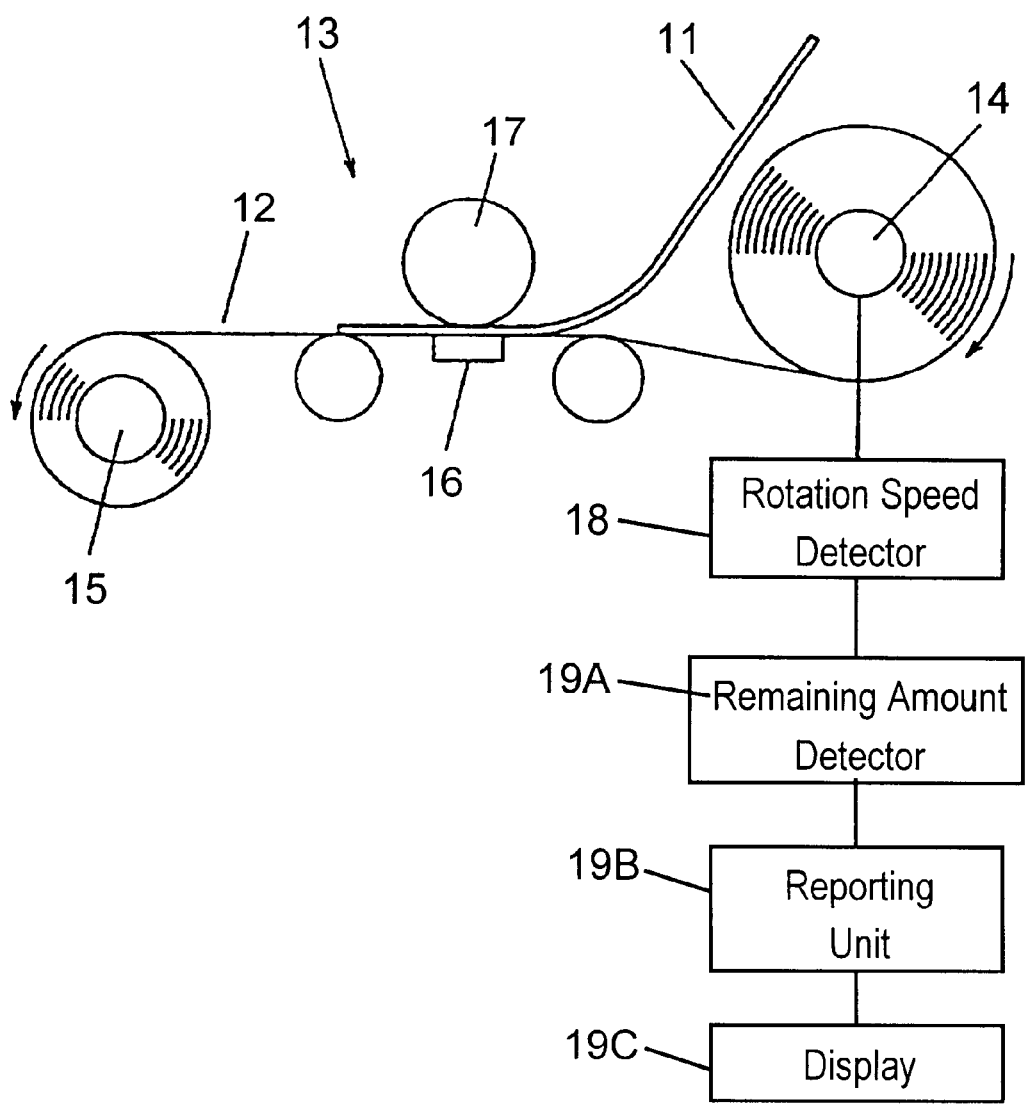
FIG. 1 schematically illustrates a method for detecting a remaining-amount in a printer in accordance with a first exemplary embodiment of the present invention.
Figure 2:
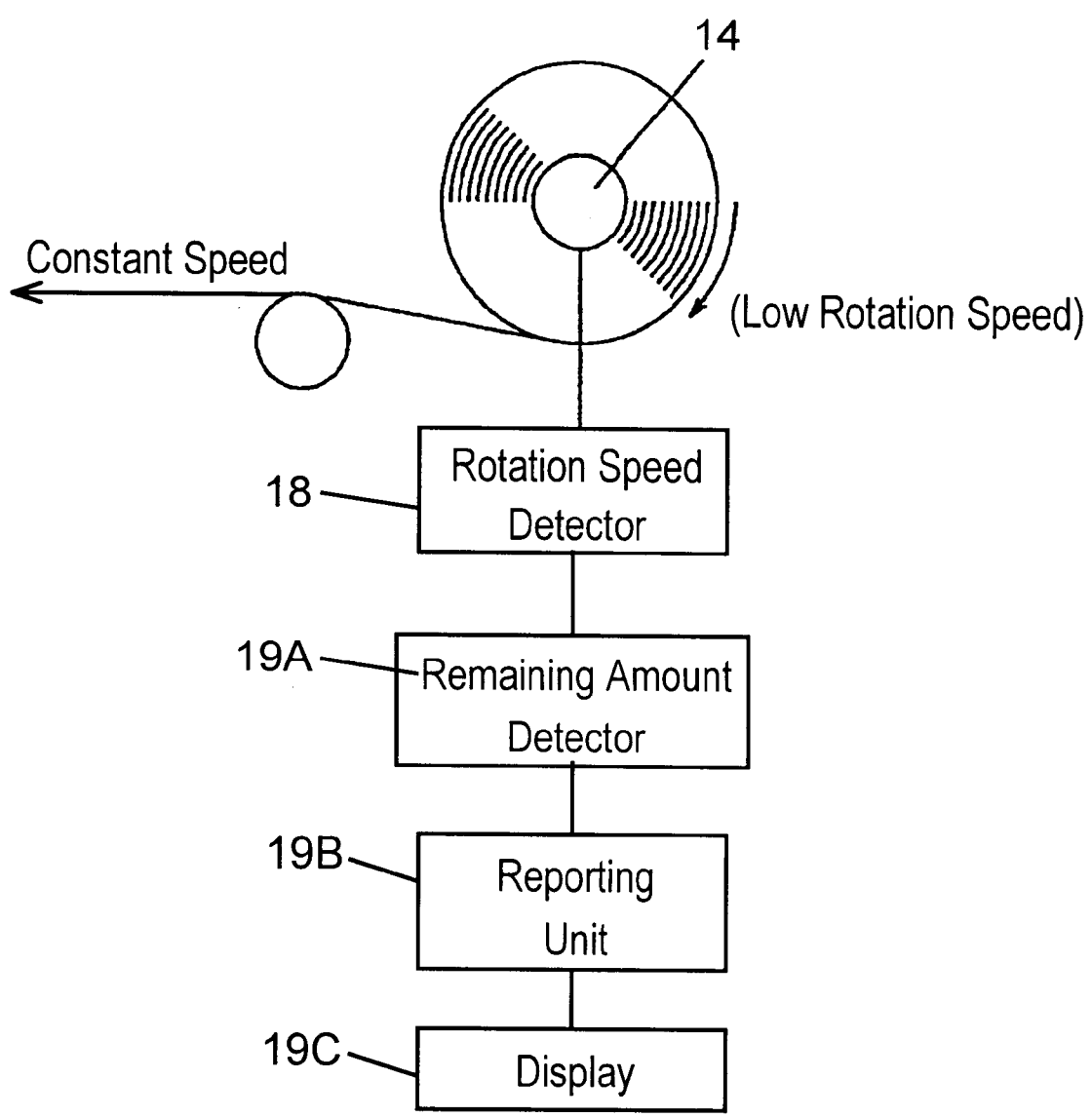
FIG. 2 schematically illustrates a rotation speed of an ink-film-supply shaft of the printer in accordance with the first exemplary embodiment.
Figure 3:
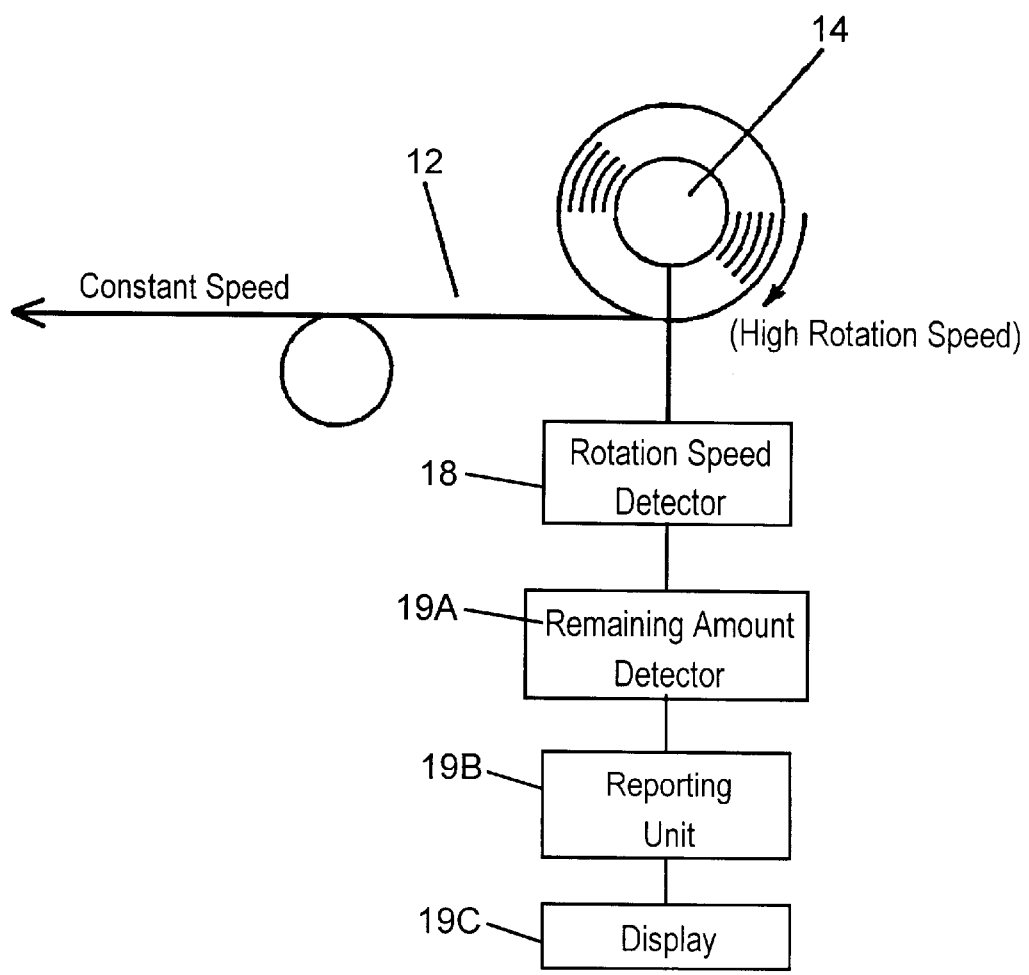
FIG. 3 schematically illustrates a rotation speed of the ink-film-supply shaft of the printer in accordance with the first embodiment.
Figure 4:
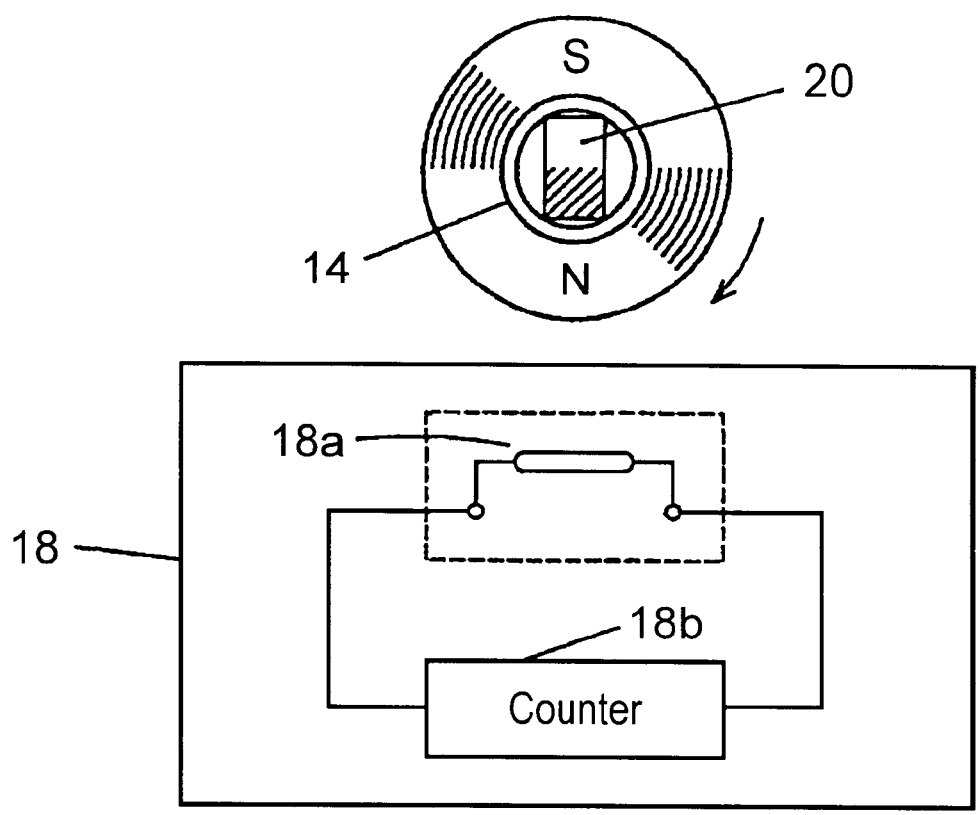
FIG. 4 is a schematic diagram of the ink-film-supply shaft and a rotation-speed detector of the printer in accordance with the first embodiment.
Figure 5:
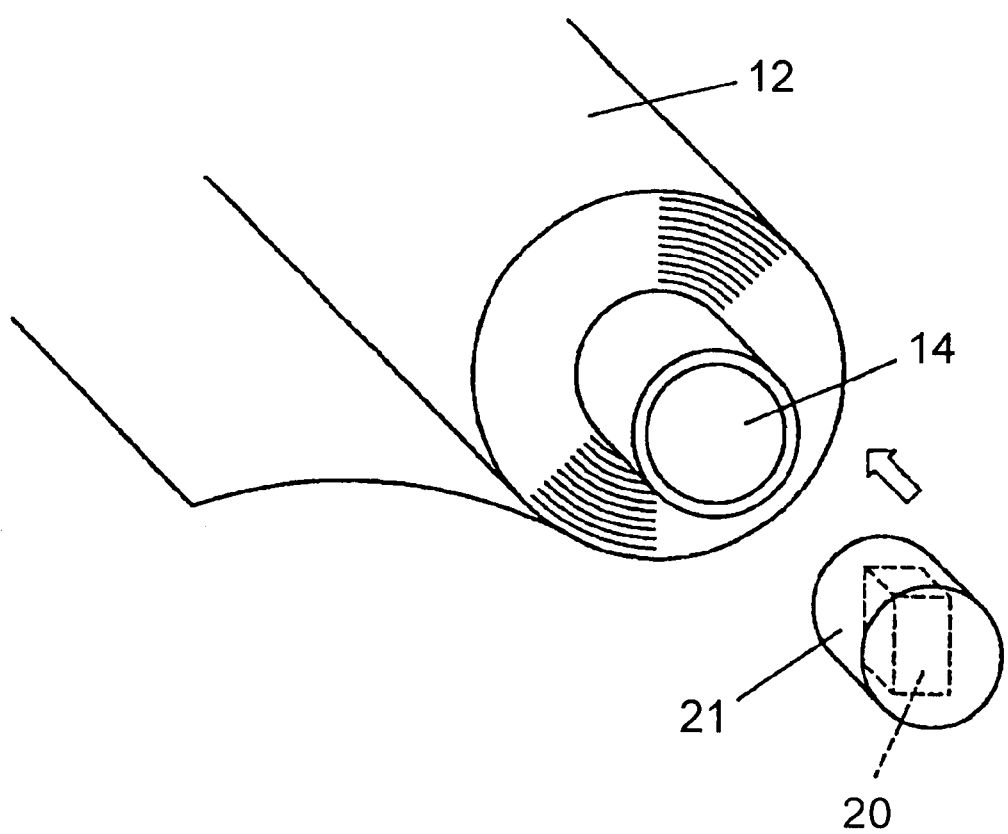
FIG. 5 schematically illustrates a magnet mounted to the supply shaft of the printer in accordance with the first embodiment.
Figure 6:
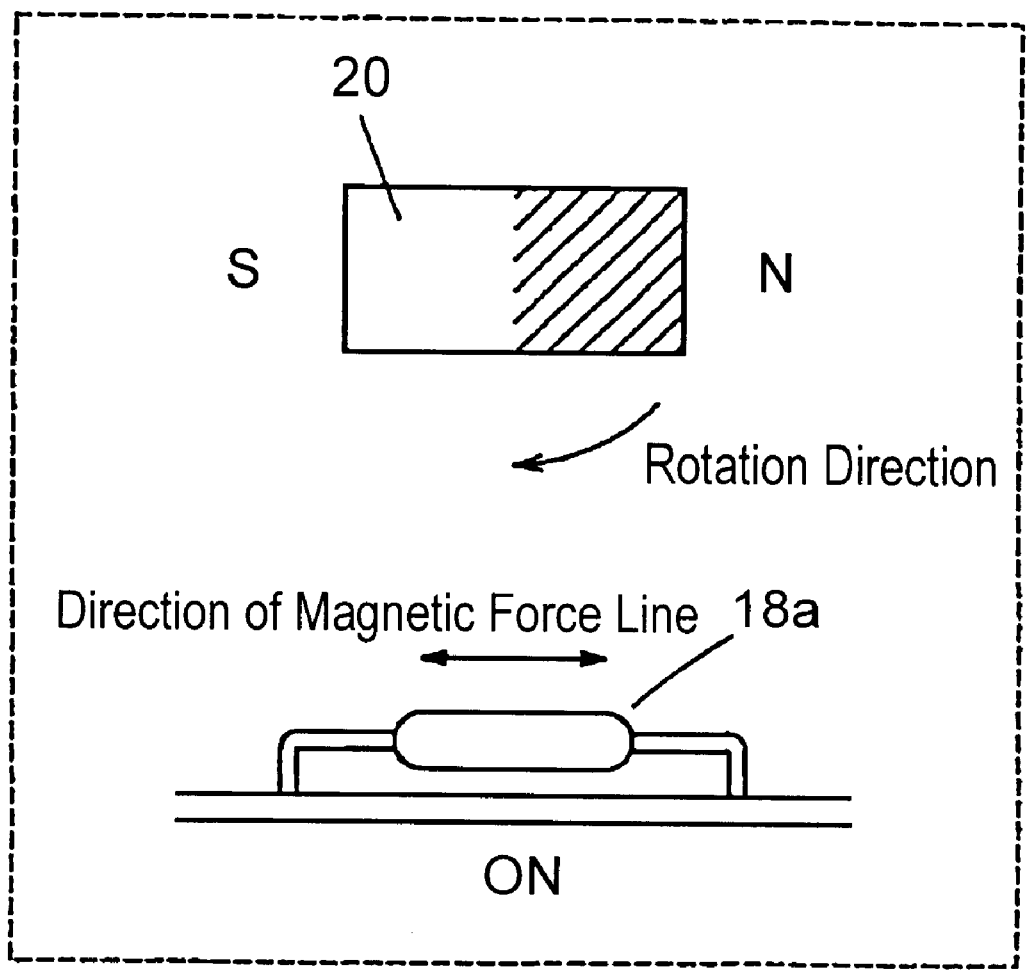
FIG. 6 illustrates a state of a reed switch turned on and off of the printer in accordance with the first embodiment.
Figure 7:
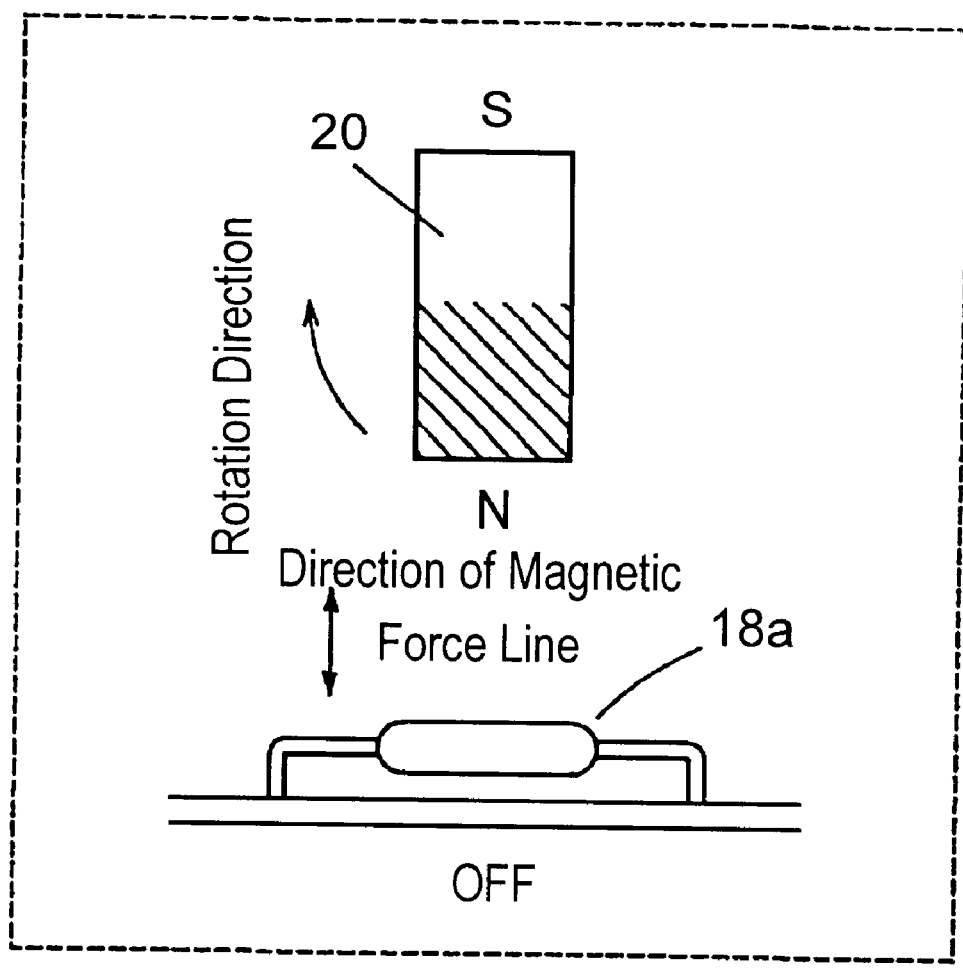
FIG. 7 illustrates a state of the reed switch turned on and off the printer in accordance with the first embodiment.
Figure 8:
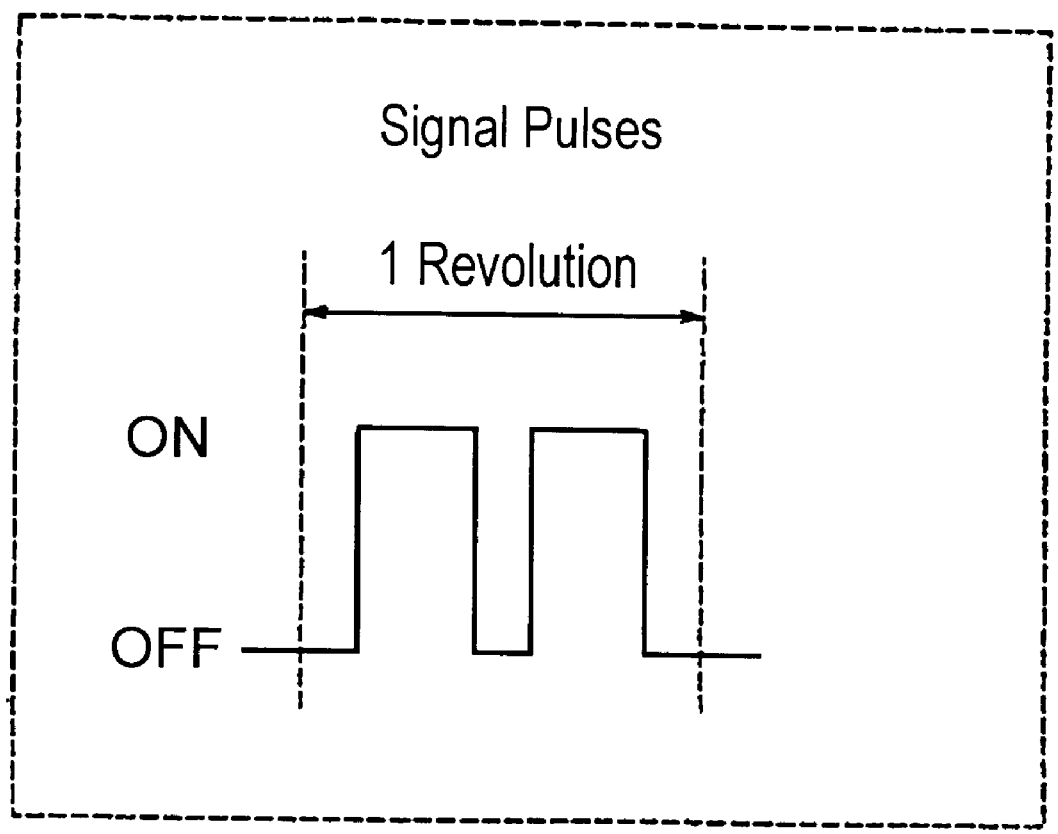
FIG. 8 shows signal pulses of the reed switch of the printer in accordance with the first embodiment.
Figure 9:
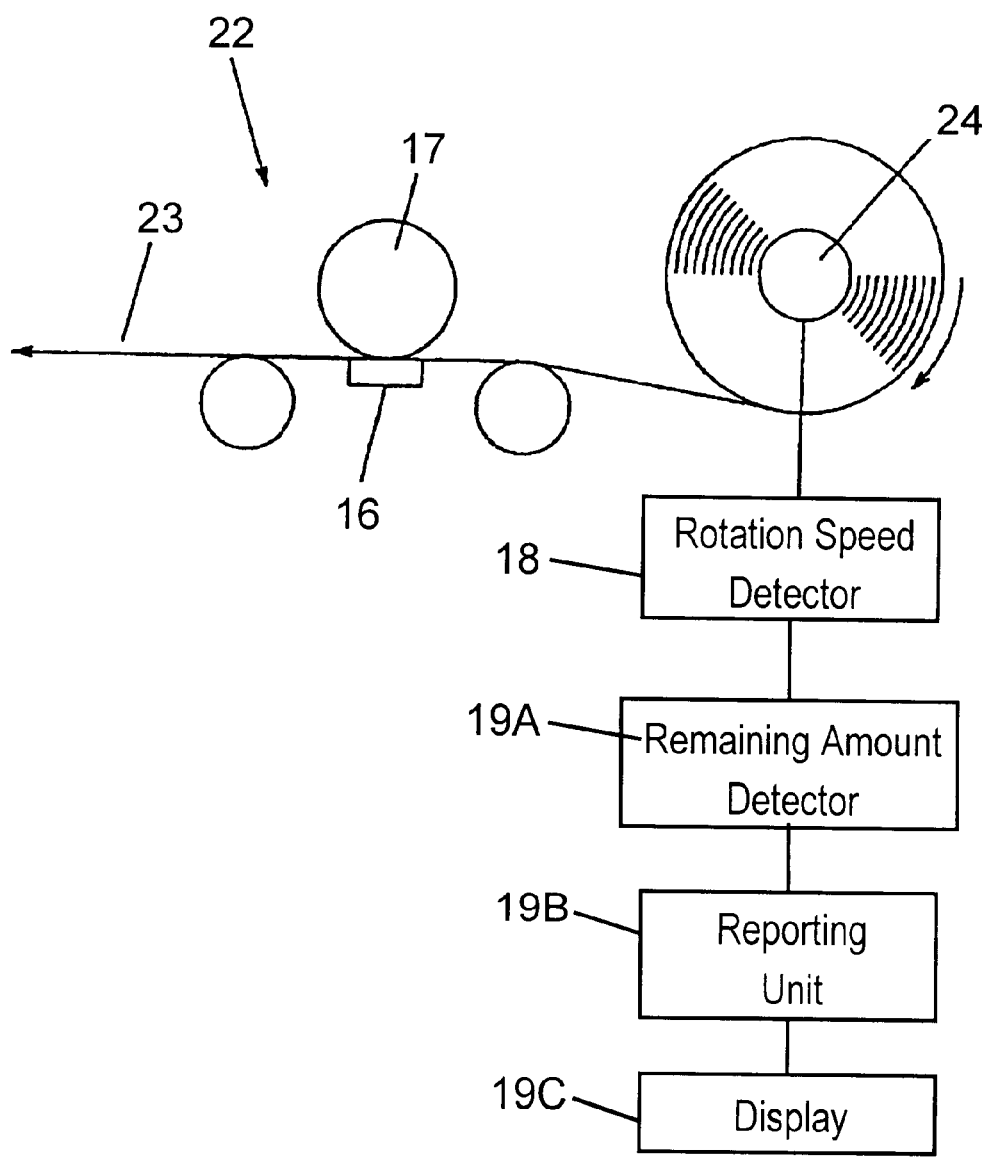
FIG. 9 schematically illustrates a method for detecting an amount of thermal recording paper remaining in a printer in accordance with a second exemplary embodiment of the present invention.
Figure 10:
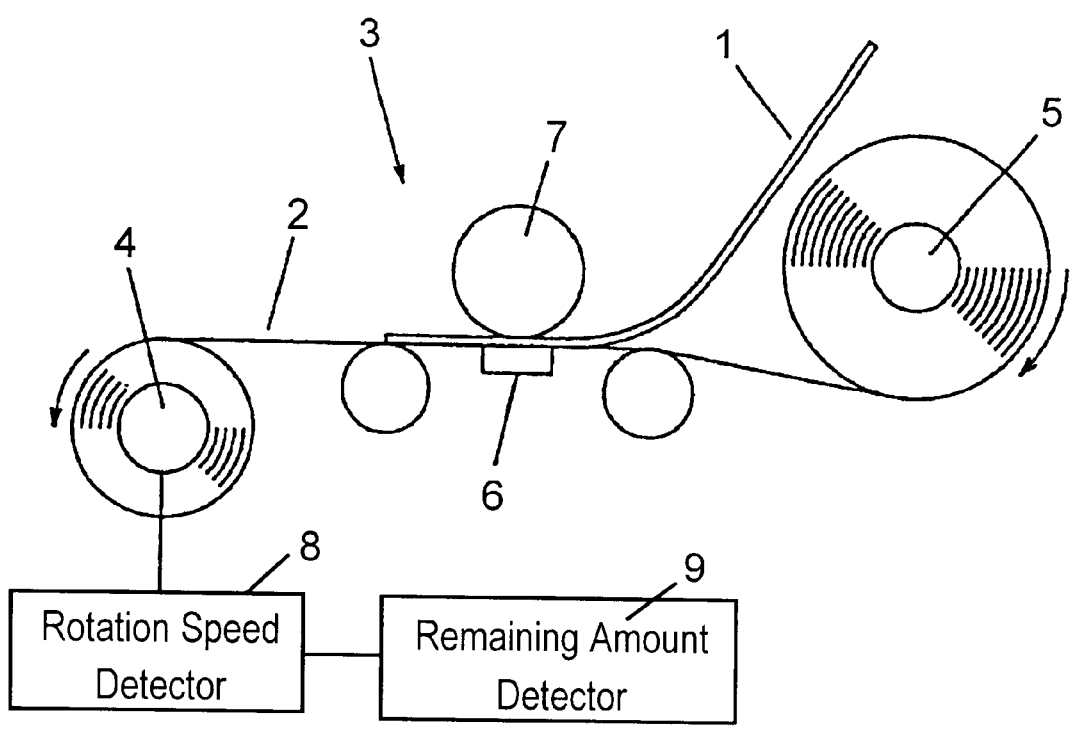
FIG. 10 schematically illustrates a method for detecting an amount of ink film remaining in a conventional printer.
Figure 11:
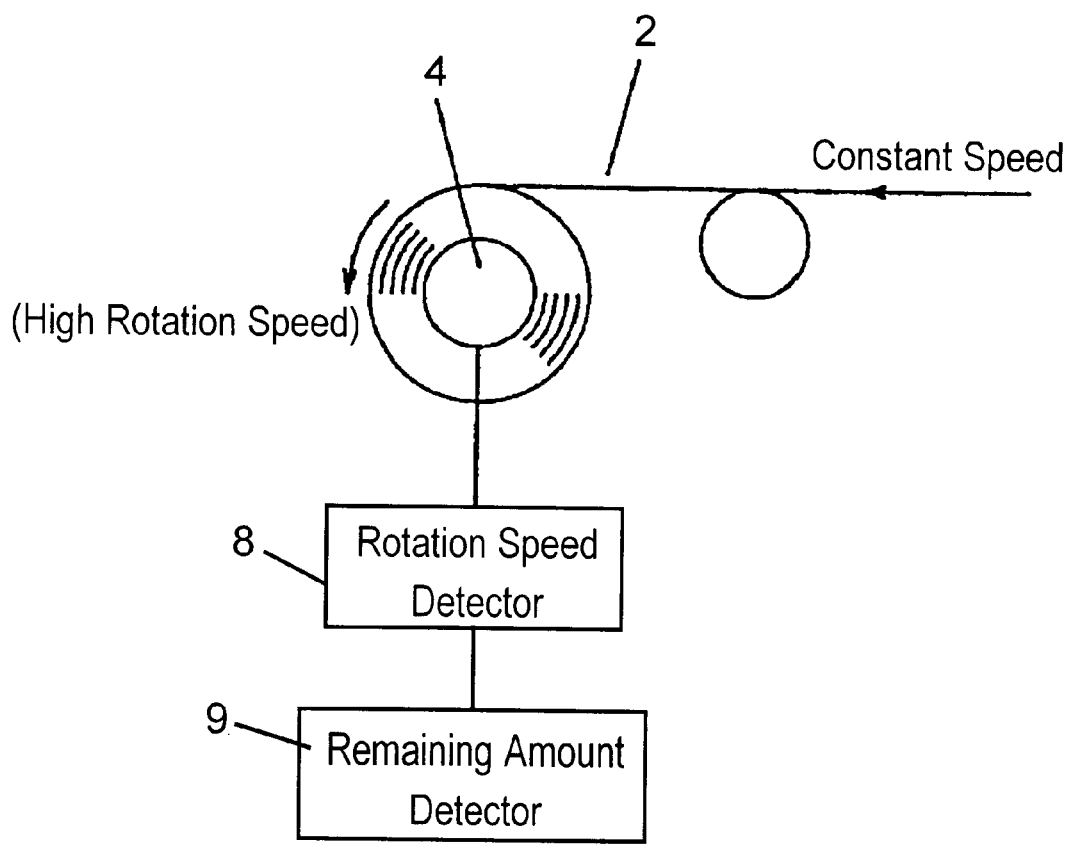
FIG. 11 schematically illustrates a rotation speed of an ink-film-winding shaft of the conventional printer.
Figure 12:
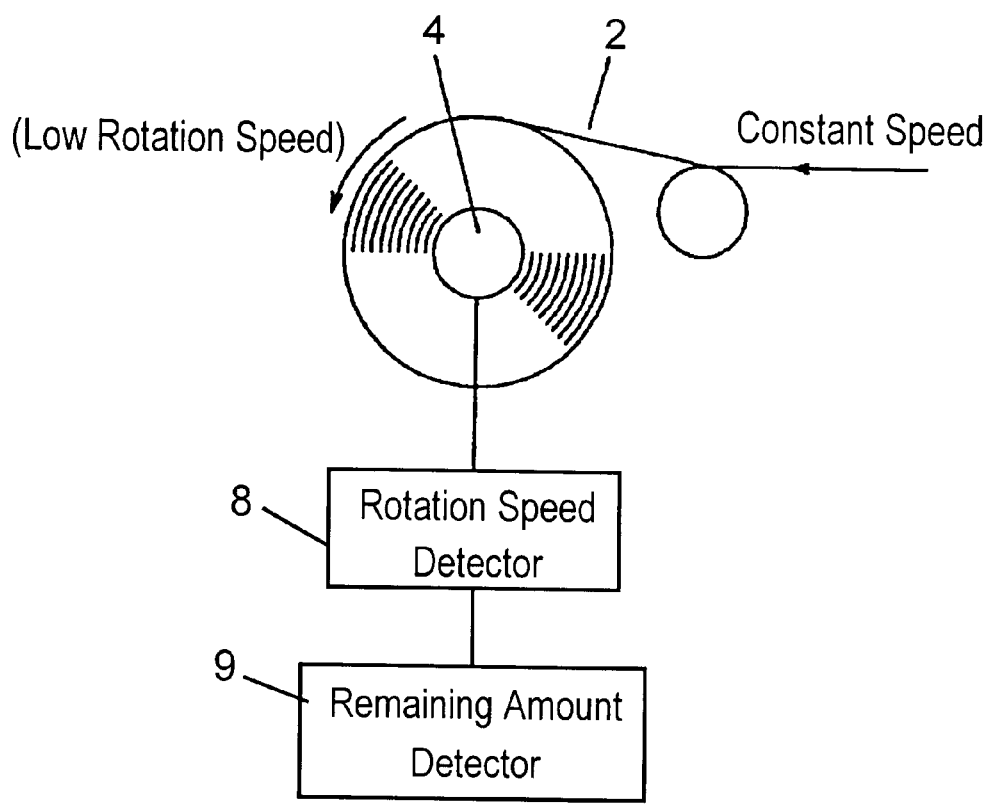
FIG. 12 schematically illustrates a rotation speed of the ink-film-winding shaft of the conventional printer.

FIG. 1 schematically illustrates a method for detecting a remaining amount in the printer in accordance with the first embodiment. FIG. 2 and FIG. 3 illustrate a rotation speed of the ink-film-supply shaft of the printer. FIG. 4 is a schematic diagram of the ink-film-supply shaft and a rotation-speed detector of the printer. FIG. 5 schematically illustrates a magnet mounted to the supply shaft of the printer. FIG. 6 and FIG. 7 illustrate states of a reed switch turned on and off of the printer. FIG. 8 shows signal pulses from the reed switch of the printer. FIG. 9 schematically illustrates a method for detecting an amount of thermal recording paper remaining in a printer.

In FIG. 1, the printer of the first embodiment includes thermal transfer head 16, platen roller 17, rotation-speed detector 18 for detecting a rotation speed of the ink film supply shaft, and remaining-amount detector 19A for detecting the remaining amount of ink film 12 based on the detected rotation speed. An ink film roll device for accommodating ink film 12 in roll form includes ink film 12, supply shaft 14 wound with unused ink film 12 and winding shaft 15 for winding up used ink film 12.

As shown in FIG. 1, printing paper 11, upon being ordinary paper 11, is printed with heat-melting ink film 12.

Printer 13 of the first embodiment differs from a conventional printer in that the remaining amount of ink film 12 remaining is determined based on the detected rotation speed of supply shaft 14.

A speed with which ink film 12 fed from supply shaft 14 passes between thermal transfer head 16 and platen roller 17 to be wound around winding shaft 15 is constant. Therefore, the rotation speed of supply shaft 14 is low when the amount of ink film 2 remaining on supply shaft 14 is large as shown in FIG. 2. The rotation speed of supply shaft 14 is high when the amount of ink film 12 remaining on supply shaft 14 becomes small as shown in FIG. 3. In the printer of the present embodiment, the remaining amount of ink film 12 is determined accurately since being determined based on the rotation speed of supply shaft 14. This rotation speed is detected accurately by rotation-speed detector 18 since the rotation speed of supply shaft 14 is high when the remaining amount of film is small.

In remaining-amount detector 19A, the rotation speed of supply shaft 14 preliminary corresponds to the remaining amount of ink film 12. Remaining-amount detector 19A determines the remaining amount of ink film 12 based on the detected rotation speed.

Rotation-speed detector 18 of the printer in accordance with this embodiment includes, as shown in FIG. 4, reed switch 18a for detecting a magnetic field and counter 18b for counting the number of states of reed switch 18a turned on and off.

In the present embodiment, magnet holder 21 integrally formed with magnet 20 is inserted, as shown in FIG. 5, into an opening at one end of supply shaft 14. Specifically, holder 21 is fixed into the opening by press fitting, an adhesive or ultrasonic welding. The other end of supply shaft 14 is provided with a supply gear.

As shown in FIGS. 6 and 7, reed switch 18a is turned on and off thorough detecting a change of direction of a magnetic force line generated by magnet 20 mounted in supply shaft 14. Reed switch 18a is turned on when the direction of the magnetic force line directing from a north pole to a south pole of magnet 20 is parallel with an axis of reed switch 18a, as shown in FIG. 6. When magnet 20 rotates in half, changing from the state shown in FIG. 6 to reverse the positions of the north and south poles, reed switch 18a is also turned on since the direction of the magnetic force line directing from the north pole to the south pole of magnet 20 is parallel with the axis of reed switch 18a.

When the direction of the magnetic force line directing from the north pole to the south pole of magnet 20 is perpendicular to the axis of reed switch 18a, as shown in FIG. 7, reed switch 18a is turned off. When magnet 20 rotates in half, changing from the state shown in FIG. 7 to reverse the positions of the north and south poles, reed switch 18a is also turned off since the direction of the magnetic force line from the north pole to the south pole of magnet 20 is perpendicular to the axis of reed switch 18a. FIG. 8 shows signal pulses corresponding to the on/off states of reed switch 18a in a single revolution of magnet 20. The number of peaks or troughs of the signal pulses is directly proportional to the number of revolutions of magnet 20.

The number of revolutions per unit time of magnet 20 represents the rotation speed of supply shaft 14. The rotation speed can be determined by counting the number of signal pulses (i.e., the number of peaks or troughs) corresponding to the on/off states of reed switch 18a per unit time with counter 18b. The more the number of on/off states per unit time of reed switch 18a, the less error in the rotation speed of supply shaft 14, and the more accurately the rotation speed can be determined. The rotation speed of supply shaft 14 increases as the remaining amount of ink film 12 decreases. Thus, the remaining amount of ink film 12 is determined more accurately when ink film 12 is nearly used up than when ink film 12 start to be used.

In other words, when the remaining amount of ink film 12 is sufficient and thus may be determined roughly, the amount can be determined less accurately. In the present embodiment, as the remaining amount of ink film 12 approaches zero, the remaining amount of ink film 12 is determined more accurately. Accordingly, the time for replacing ink film 12 can be determined accurately when the remaining amount of ink film 12 is small. Therefore, the printer of this embodiment may generate a warning of the remaining amount of ink film 12 right before ink film 12 runs out.

Whether ink film 12 is placed in printer 13 or not can be determined through determining whether supply shaft 14 rotates or not. This enables rotation-speed detector 18 to be a substitute for a detector of ink film 12.

Further, in the present embodiment, remaining-amount detector 19A judges that the rotation speed detected by detector 18 exceeds a predetermined speed and then issues a notification of this result to reporting unit 19B for display this result at a display screen of display 19C. At this moment, an alarm may be sounded simultaneously with this display by a sound generator (not shown).

(Exemplary Embodiment 2)

A thermal transfer printer may employ thermal recording paper 23 as recording paper. FIG. 9 shows thermal transfer printer 22 employing the thermal recording paper in roll form. Printer 22 includes, similarly to the first embodiment, thermal transfer head 16, platen roller 17, rotation-speed detector 18 for detecting a rotation speed of a supply shaft and remaining-amount detector 19A for determining a remaining amount of ink film or the thermal recording paper based on the detected rotation speed detected. Unused thermal recording paper 23 is wound around supply shaft 24.

The remaining amount of thermal recording paper 23 can be determined through detecting the rotation speed of supply shaft 24. As mentioned in above, rotation-speed detector 18 detects the rotation speed of supply shaft 24, and remaining-amount detector 19A determines the remaining amount of thermal recording paper 23.

Thermal recording paper 23 generally has, at an ending portion thereof, a colored part functioning as an index of the remaining amount. This allows the remaining amount of thermal recording paper 23 to be detected roughly at about three levels according to the second embodiment.

As described in above in the present embodiment, the rotation speed of the thermal recording paper supply shaft is detected, and the remaining-amount detector determines the remaining amount of thermal recording paper based on the rotation speed. Thus, the smaller the remaining amount is, the more accurately the remaining amount is determined. Therefore, the printer can issue a warning of the remaining amount at an appropriate time right before the thermal recording paper is used up.

Further, similarly to remaining-amount detector 19A of the first embodiment, remaining-amount detector 19A of this embodiment judges that the rotation speed detected by detector 18 exceeds a predetermined speed and provides a notification of this result to reporting unit 19B for display this result at a display screen of display 19C, and an alarm may be sounded simultaneously with this display by a sound generator (not shown).

Many modifications may be made from the art of the present invention and are not described specifically herein. However, these modifications are intended to fall within the scope of the present invention.

For example, the rotation-speed detector of the first embodiment includes the magnet mounted to the supply shaft to detect the rotation speed. However, the present invention is not so limited to it, and the rotation speed may be detected by a mechanical detector, e.g. a switch, an optical detector, or other electromagnetic detector.

The same advantage can be obtained when the ink film and the thermal recording paper used in the printers of the first and second embodiments are replaced by a printing member accommodated in roll form and including contrast agent added or applied thereto.

What is claimed is:

1. A printer for thermal-printing with an ink film, comprising:
    a rotation-speed detector for detecting a rotation speed of a shaft wound with said ink film;
    a remaining-amount detector for judging whether or not a remaining amount of said ink film determined from a detecting result of said rotation detector is smaller than a predetermined value;
    a display; and
    a reporting unit for displaying, in said display, a judging result of said remaining-amount detector.

2. The printer of claim 1, wherein said rotation-speed detector detects said rotation speed based on a variation in magnetic field caused by rotation of said shaft with said ink film.

3. The printer of claim 2, further comprising a magnetic field generator disposed at said shaft with said ink film.

4. A printer for thermal-printing a thermal recording paper, comprising:
    a rotation-speed detector for detecting a rotation speed of a shaft wound with said thermal recording paper;
    a remaining-amount detector for judging whether or not a remaining amount of said thermal recording paper determined from a detecting result of said rotation detector is smaller than a predetermined value;
    a reporting unit for displaying a judging result of said remaining-amount detector in a display.

5. The printer of claim 4, wherein said rotation-speed detector detects said rotation speed based on a variation in magnetic field caused by rotation of said shaft with said thermal recording paper.

6. The printer of claim 5, further comprising a magnetic field generator disposed at said shaft with said thermal recording paper.

7. A printer comprising:
    a supply shaft wound with unused film having contrast agent;
    a winding shaft wound with used film having used contrast agent;
    a rotation-speed detector for detecting a rotation speed of said supply shaft; and
    a remaining-amount detector for determining whether an amount of said unused film is smaller than a predetermined value from said detected rotation speed.

8. The printer of claim 7, wherein said rotation-speed detector detects said rotation speed based on a variation in magnetic field caused by rotation of said supply shaft.

9. The printer of claim 8, further comprising a magnetic field generator disposed at said supply shaft.

10. The printer of claim 7, wherein said remaining-amount detector determines whether said amount of said unused film is smaller than said predetermined value by determining whether said rotation speed of said supply shaft is lower than a predetermined speed.

11. The printer of claim 10, further comprising a display for displaying a determining result of said remaining-amount detector.

12. The printer of claim 1, wherein said ink film wound at said shaft is unused.

13. The printer of claim 4, wherein said thermal recording paper wound at said shaft is unused.

14. A device comprising:
    an ink film;
    a supply shaft wound with an unused ink film of said ink film;
    a winding shaft for being wound with a used ink film of said ink film; and
    a magnet disposed at said supply shaft.

15. The device of claim 14, wherein said magnet is disposed at an edge of said supply shaft.

16. The device of claim 15, further comprising a magnet holder for holding said magnet, wherein:
    supply shaft is provided with an opening at an edge of said supply shaft, and
    said magnet holder is fixed at said opening.

17. The device of claim 16, wherein said magnet holder is integrally formed with said magnet.

18. The device of claim 14, wherein said magnet is used for detecting a rotation speed of said supply shaft.

19. The device of claim 18, wherein said magnet is used for detecting an amount of said unused ink film based on said rotation speed.

20. The device of claim 18, wherein said magnet is used for judging, based on said rotation speed, whether or not an amount of said unused ink film is smaller than a predetermined value.

* * * * *